United States Patent Office 3,826,819
Patented July 30, 1974

3,826,819
SULFURIC ACID PURIFICATION PROCESS
Bruno Orlandini and Taesung Um, Kellogg, and Andrew H. Larson, Pinehurst, Idaho, assignors to The Bunker Hill Company, Kellogg, Idaho
No Drawing. Filed Apr. 21, 1972, Ser. No. 246,224
Int. Cl. C01b 17/90
U.S. Cl. 423—531                3 Claims

ABSTRACT OF THE DISCLOSURE

A sulfuric acid purification process is described for removing or reducing the dissolved mercury concentration in concentrated sulfuric acid (87–96%) to a value less than three (3) parts per million and preferably less than one (1) part per million. Unpurified or raw concentrated sulfuric acid from an acid forming plant is first cooled to a temperature below 20° C. and preferably below 10° C. and is then treated with hydrogen sulfide gas in amounts equal to or greater than the stoichiometric equivalent to the dissolved mercury content. The acid is then aged for a period greater than 16 hours to allow the dissolved or dispersed hydrogen sulfide to fully react with the dissolved mercury to form a mercury sulfide precipitate. The precipitate is then removed from the acid by filtration. The dissolved $SO_2$ impurity is then stripped from the acid.

BACKGROUND OF THE INVENTION

This process relates to sulfuric acid purification processes and more particularly to those purification processes concerned with the reduction or removal of dissolved mercury impurities.

To minimize the pollution problems associated with sulfide ore smelting and roasting operations, particularly, the discharge of flue gases into the atmosphere containing $SO_2$, considerable effort has been exerted to form an economically important by-product from the $SO_2$ by removing the $SO_2$ from the flue gases and forming concentrated sulfuric acid that can be sold on a basis that is competitive with concentrated sulfuric acid produced by conventional methods. However, one of the stumbling blocks in forming a commercially acceptable by-product of sulfuric acid from smelter or roaster flue gases has been the high mercury content found to exist in the product sulfuric acid. Thus many sulfide ore smelting or roasting operations have found that the sulfuric acid that is produced as by-product is commercially unacceptable. Many purchasers of concentrated sulfuric acid require that the sulfuric acid have a mercury content less than three parts per million and it is becoming more evident that sulfuric acid having a mercury concentration above one part per million will have a very limited commercial market with the additional impediment of a significant market price differential between sulfuric acid having mercury content less than one part per million and sulfuric acid having a mercury content greater than one part per million.

It is found that it is not unusual for the concentrated sulfuric acid produced from flue gases generated from sulfide ore smelters or roasters to have a mercury concentration between 40 and 100 parts per million. Unless the mercury concentration can be reduced to less than three parts per million and preferably less than one part per million, such sulfuric acid will be unable to find a market.

Although methods of removing metallic impurities, particularly mercury, from sulfuric acid solutions are not unknown to the technical arts, no known inexpensive process is available for reducing the mercury content in concentrated sulfuric acid to values below three parts per million and particularly less than one part per million.

One of the known processes of removing metallic impurities from sulfuric acid involves contacting the sulfuric acid with soluble sulfides to form metallic sulfides of low solubility. One of the first processes along this line is disclosed in the 1884 British Pat. No. 6,215. Additional disclosures of similar processes are described in U.S. Pat. 314,548 (1885); 1,891,294 (1932); and 3,145,080 (1964). As noted in U.S. Pat. 3,145,080 one of the principle problems with the addition of a soluble sulfide such as hydrogen sulfide to sulfuric acid is the difficulty of filtering or removing the metallic sulfide precipitate from the solution. Furthermore, it is found that by utilizing these traditional methods, one is unable to reduce the mercury content to values below three parts per million or down as far as one part per million. Generally the prior art processes require excess amounts of hydrogen sulfide to be added to the sulfuric acid in an attempt to significantly purify the sulfuric acid. U.S. Pat. 1,891,294 attempts to overcome this problem by providing an organic acid that is lighter than the sulfuric acid to froth the precipitate. U.S. Pat. 3,145,080 goes in an opposite direction in attempting to overcome this problem by diluting the acid to approximately 20% by weight and then passing the acid through an active carbon bed to absorb the precipitate on to the carbon.

One of the major problems associated with such techniques is that a major portion of the hydrogen sulfide appears to react with the sulfuric acid to form an elemental sulfur precipitate which is extremely difficult to remove.

One of the principal objects of this invention is to provide a process for reducing the mercury content in concentrated sulfuric acid to a value below three parts per million and preferably to a value less than one part per million.

An additional object of this invention is to provide a purification process for reducing mercury concentration in the sulfuric acid to a value less than one part per million while at the same time minimizing the filtering problems associated with the removal of precipitated mercury sulfide from the sulfuric acid.

A further object of this invention is to provide a purification process for removing mercury from concentrated sulfuric acid without having to add additional reagents other than hydrogen sulfide.

An additional object of this invention is to provide a purification process for removing mercury from concentrated sulfuric acid in a manner minimizing the reagent required to form mercury sulfide precipitate.

A further object of this invention is to provide a purification process utilizing hydrogen sulfide to form a mercury sulfide precipitate in such a manner as to minimize the amount of elemental sulfur formed and thereby reduce significantly the filtration problem associated with removing the precipitates.

These and other objects of this invention will become apparent upon reading the following detailed description of a preferred embodiment of this invention.

DETAILED DESCRIPTION OF A PREFERRED EMBODIMENT

A conventional method of forming concentrated sulfuric acid from smelter or roaster flue gas involves passing the gas through dry and wet scrubbers and cleaning equipment to remove the moisture and particulate content from the gas. The $SO_2$-containing flue gas is then passed to an acid plant where the flue gas passes through a drying tower (93% acid) and then is passed through a converting apparatus to convert the $SO_2$ to $SO_3$. Generally this process is accomplished by passing the gas through beds of vanadium pentoxide ($V_2O_5$) to convert the $SO_2$ to $SO_3$. Many commercial plants are able to convert approximately 97% of the $SO_2$ to $SO_3$. The gases are then passed through a sulfuric acid absorbing tower to strip the $SO_3$ from the gas and form a raw concentrated sulfuric acid (93–99%). A raw product acid of between 93% and 99% is bled from the system at a temperature of about 35°–45° C. and which may be diluted to form a product acid of between 87% and 96% sulfuric acid. It has been found that the product sulfuric acid formed from the flue gases of ore roasting or smelting operations utilizing rather high mercury content ores may have mercury concentrations of between 40 and 100 parts per million of dissolved mercury. Furthermore, the product sulfuric acid contains between 80 and 1260 parts per million of $SO_2$. The $SO_2$ impurity is frequently stripped from the product acid before the acid is used.

The amount of metallic and other impurities in the raw acid is generally dependent upon the nature of the ore being smelted or roasted.

The applicant has found that if hydrogen sulfide is bubbled into the product sulfuric acid as it comes from sulfuric acid production plant as suggested by the prior methods, one is unable to reduce the mercury concentration below three parts per million even though large excess amounts of hydrogen sulfide are utilized. Furthermore, it is found that the resulting precipitate is very difficult to filter. It appears that the precipitate contains significant amounts of elemental sulfur.

The applicant has found that by reducing the temperature of the product concentrated sulfuric acid (87–96% $H_2SO_4$) below normal to a temperature less than 20° C. and above the freezing point of the acid and then contacting the cooled sulfuric acid with hydrogen sulfide gas that the mercury content can be reduced to a value below three parts per million. Additionally it is found that the amount of hydrogen sulfide required to reduce the mercury to such a level can be greatly reduced. It is found that such favorable results can be obtained by adding hydrogen sulfide to the cooled solution in an amount slightly in excess of the stoichiometric equivalent to the amount of dissolved mercury impurity in the solution. Thus for raw acid containing 40–100 parts per million of mercury, it has been found that 14–35 mg. $H_2S$/liter of acid (9–23 cc. @ STP of $H_2S$/liter of acid) is satisfactory. It is preferable to add approximately 10–20% excess over its stoichiometric equivalent to insure mercury removal and minimize the amount of elemental sulfur sludge precipitate.

It has been found that if the acid temperature is reduced to a temperature below 10° C. and above the freezing point of the acid and then sparged with hydrogen sulfide gas that the mercury concentration can be reduced to a concentration of less than one part per million.

It is necessary that the temperature of the sulfuric acid after being contacted by the hydrogen sulfide be mantained at a temperature of 20° C. or below and above the freezing point of the acid for an aging period to allow the dissolved or dispersed hydrogen sulfide to fully react with the dissolved mercury. It was found that if the temperature of the sulfuric acid is raised above 20° C. during this period that one is unable to obtain a purified product of less than one part per million of mercury.

It appears that the rate of the reaction

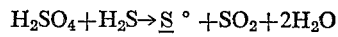

$H_2SO_4 + H_2S \rightarrow \underline{S}° + SO_2 + 2H_2O$ is retarded considerably by a temperature decrease below 20° C., but the rate of reaction

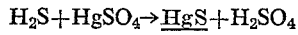

$H_2S + HgSO_4 \rightarrow \underline{HgS} + H_2SO_4$ is not retarded to the same degree. These reactions are described as such for purposes of illustration and are not intended to represent actual kinetic mechanisms on a molecular scale.

The residence or aging time required to enable the dissolved or dispersed hydrogen sufide to fully react with the dissolved mercury to obtain the desired results varies somewhat with the operating conditions. However, it is found that it is preferable in order to reduce the dissolved mercury content to maintain the temperature of the solution below 20° C. subsequent to the application of the hydrogen sulfide gas for at least 16 hours before removing the precipitate from the solution.

If it is desired to obtain what is termed "crystal" acid or "clear" acid additional residence time may be required due to the relatively slow formation of elemental sulfur resulting from use of a stoichiometric excess of hydrogen sulfide gas.

The sulfuric acid is treated with the hydrogen sulfide by sparging hydrogen sulfide gas into the sulfuric acid. To obtain optimum contact it is desirable to sparge the gas into the acid in very small dispersed bubbles. Sparging pressures of 3–25 p.s.i.g. have been satisfactorily employed. In conventional methods of forming purified concentrated sulfuric acid, the $SO_2$ impurity is stripped from the acid before the acid is stored. It has been found, for reasons unknown to the applicant, that the presence of $SO_2$ is beneficial to the mercury removal process. Thus it is preferable to delay the removal of the $SO_2$ impurity from the raw sulfuric acid until the mercury precipitate has been removed. The $SO_2$ is subsequently stripped or removed from the sulfuric acid solution by passing dry air through the acid before the acid is shipped to the purchaser or before the sulfuric acid is used. It may be desirable to strip the $SO_2$ to a level below 40 parts per million, depending upon customer specifications.

In a best mode contemplated for the use of this invention, the plant sulfuric acid having a concentration of 87–96% $H_2SO_4$ is cooled after leaving the acid plant circuit to a temperature below 10° C. and then contacted with hydrogen sulfide by bubbling or sparging hydrogen sulfide gas into the sulfuric acid in an amount slightly greater than the stoichiometric equivalent to the mercury concentration with approximately 10–20% in excess. The cooled sulfuric acid then is stored at a temperature less than 20° C. for a period of greater than 16 hours to allow the dissolved or dispersed hydrogen sulfide to fully react with the dissolved mercury to reduce the dissolved mercury content to less than one (1) part per million. The acid is then filtered to remove the mercury sulfide precipitate from the acid. The $SO_2$ impurity is then removed from the acid to provide a purified concentrated sulfuric acid that is ready for shipment or use.

Examples of the results obtained are as follows:

EXAMPLE NO 1

A sample of product sulfuric acid solution from the acid plant containing approximately 61 parts per million of mercury and having a $H_2SO_4$ concentration of approximately 93% by weight was processed according to this invention. The temperature of the acid was lowered to approximately 11° C. and then contacted with hydrogen sulfide. The hydrogen sulfide was sparged into the solution at a rate of approximately 31.5 cc. @ STP per liter of the acid. The acid was stored for approximately 44 hours at 20° C. After 44 hours of storage the acid solution after filtration contantained approximately 1.1 parts per million of mercury. The $SO_2$ impurity was subsequently stripped from the acid.

EXAMPLE NO. 2

A sample of the same product acid was processed in the same manner as outlined in Example 1, except the acid was stored at approximately 10° C. for 44 hours. After filtration the mercury content was approximately 0.68 parts per million.

EXAMPLE NO. 3

A sample of the same product acid mentioned in Example No. 1 was cooled to a temperature of approximately 5° C. and then contacted with hydrogen sulfide by bubbling hydrogen sulfide into the acid at a rate of 31.5 cc. @ STP per liter of acid. The acid was stored for approximately 19 hours at 10° C. The filtered acid at the end of 19 hours contained approximately 0.42 parts per million of mercury. The $SO_2$ impurity was subsequently stripped from the acid.

EXAMPLE NO. 4

A product acid sample 88% $H_2SO_4$ containing approximately 80 parts per million of mercury was processed by cooling the acid to a temperature between 11–13° C. and subsequently contacted with hydrogen sulfide at the rate of 59.6 cc. @ STP of hydrogen sulfide per liter of sulfuric acid solution. After 18 hours of storage at approximately 10° C., the filtered acid contained a mercury content of less than 0.30 parts per million.

EXAMPLE NO. 5

A sample of product acid (93% $H_2SO_4$) having a mercury content of 45 parts per million was first treated to strip the $SO_2$ from the acid. The acid was then cooled to a temperature of approximately 3.0° C. and contacted with hydrogen sulfide at a rate of 60.7 cc. @ STP per liter of acid. After 22½ hours of storage (aging) at a temperature of approximately 10° C. the acid contained 1.10 parts per million of mercury.

EXAMPLE NO. 6

A sample of product acid (93% $H_2SO_4$) having a mercury content of 45 parts per million was cooled to approximately 3.0° C. and then contacted with hydrogen sulfide at a rate of 53.6 cc. @ STP per liter of acid. After 22 hours of storage (aging) at 10° C. the acid contained 0.38 parts per million. The $SO_2$ was subsequently stripped from the acid.

Additional Examples 7–13 are illustrated in Table 1 for samples taken from product acids of approximately 93% $H_2SO_4$.

TABLE I.—SULFURIC ACID PURIFICATION EXAMPLES

| Ex. | Initial mercury (p.p.m.) | Final mercury (p.p.m.) | Hydrogen sulfide (cc. at STP/liter acid) | Percent of stoichiometric hydrogen sulfide requirement | Sparging temperature (° C.) | Aging temperature (° C.) | Aging time (hr.) |
|---|---|---|---|---|---|---|---|
| 7 | 76 | 71.2 | 5.4 | 35 | −3 | 10 | 17 |
| 8 | 76 | 0.46 | 15.0 | 100 | −2 | 10 | 18 |
| 9 | 76 | 0.55 | 15.0 | 100 | 0 | 10 | 16 |
| 10 | 61 | 0.34 | 17.9 | 140 | −3 | 10 | 18 |
| 11 | 61 | 0.50 | 28.9 | 230 | 5 | 10 | 19 |
| 12 | 43.5 | 4.2 | 26.1 | 290 | 42 | 10 | 24 |
| 13 | 43.5 | 1.1 | 26.1 | 290 | 2 | 24 | 24 |

Examples 5 and 6 indicate the difference in results obtained when the $SO_2$ is stripped from the acid prior to the hydrogen sulfide treatment. It is preferable to remove the mercury from the acid prior to removing the $SO_2$.

It should be understood that the above described embodiment is simply illustrative of the principles of this invention and numerous embodiments may be readily devised without deviating therefrom. Therefore only the following claims are intended to define or limit this invention.

What is claimed is:

1. In the purification of commercial grade concentrated aqueous sulfuric acid solution containing dissolved mercury impurities by contacting the sulfuric acid with soluble sulfide to form mercury sulfides of low solubility, the improvement for reducing said impurity concentration to a value less than one part per million in an unpurified concentrated sulfuric acid solution having a sulfuric acid concentration of between 87 and 96% by weight which comprises:

cooling the concentrated sulfuric acid solution to a temperature less than 10° C. and above the freezing point of the solution;

contacting the cooled concentrated sulfuric acid solution with hydrogen sulfide in an amount equal to or greater than the stoichiometric equivalent to the amount of dissolved mercury impurity in the unpurified concentrated sulfuric acid solution to react the hydrogen sulfide with the dissolved mercury to form a mercury sulfide precipitate;

maintaining the temperature of the concentrated sulfuric acid solution below 20° C. and above the freezing point of the solution for an aging period sufficient to enable the hydrogen sulfide to fully react with the dissolved mercury to reduce the dissolved mercury concentration in the concentrated sulfuric acid solution to less than one (1) part per million; and removing the mercury sulfide precipitate from the concentrated sulfuric acid solution.

2. The purification process as defined in claim 1 wherein the cooled concentrated sulfuric acid solution is maintained at a temperature below 20° C. for a period greater than sixteen (16) hours subsequent to being contacted with the hydrogen sulfide before the mercury precipitate is removed from the solution.

3. The purification process as defined in claim 1 wherein the unpurified concentrated sulfuric acid contains sulfur dioxide and wherein the purification process is designed to additionally remove the sulfur dioxide by maintaining the sulfur dioxide in solution until after the mercury is removed and then stripping the sulfur dioxide from the solution.

References Cited

UNITED STATES PATENTS

| | | | |
|---|---|---|---|
| 3,145,080 | 8/1964 | Jockers et al. | 423—531 |
| 2,860,952 | 11/1958 | Bergeron et al. | 423—561 X |
| 1,546,048 | 7/1925 | Vogel | 423—574 X |
| 1,891,294 | 12/1932 | Conway et al. | 423—531 X |
| 3,718,457 | 2/1973 | Entwisle et al. | 423—561 X |
| 1,842,884 | 1/1932 | Taylor | 423—525 |
| 2,846,305 | 8/1958 | Ashley et al. | 423—101 X |

OSCAR R. VERTIZ, Primary Examiner

B. E. HEARN, Assistant Examiner

U.S. Cl. X.R.

423—101, 561